(12) United States Patent
Brezet et al.

(10) Patent No.: US 8,283,794 B2
(45) Date of Patent: Oct. 9, 2012

(54) FLOOR SUITABLE FOR GENERATING, CONVERTING AND/OR STORING ENERGY

(75) Inventors: Johannes Cornelis Brezet, Rotterdam (NL); Alljd Johanna van Doorn, Rotterdam (NL); Stef van Dongen, Rotterdam (NL); Anouk Randag, Delft (NL); Arend Jan Jansen, Delft (NL); Johannes Jacobus Hubertus Paulides, Waalwijk (NL); Jacob Willem Jansen, Waalre (NL); Elena Andreevna Lomonova, Eindhoven (NL)

(73) Assignee: Sustainable Dance Club B.V., Rotterdam (NL)

( * ) Notice: Subject to any disclaimer, the term of this patent is extended or adjusted under 35 U.S.C. 154(b) by 18 days.

(21) Appl. No.: 12/680,207

(22) PCT Filed: Sep. 26, 2008

(86) PCT No.: PCT/NL2008/050621
§ 371 (c)(1),
(2), (4) Date: Jul. 1, 2010

(87) PCT Pub. No.: WO2009/041817
PCT Pub. Date: Apr. 2, 2009

(65) Prior Publication Data
US 2010/0295322 A1  Nov. 25, 2010

(30) Foreign Application Priority Data
Sep. 28, 2007  (NL) .................................... 1034439

(51) Int. Cl.
*F02B 63/04* (2006.01)

(52) U.S. Cl. .................................... 290/1 R

(58) Field of Classification Search .................... 290/1 R
See application file for complete search history.

(56) References Cited

U.S. PATENT DOCUMENTS

| | | | | |
|---|---|---|---|---|
| 3,885,163 | A * | 5/1975 | Toberman | 290/1 R |
| 4,239,974 | A * | 12/1980 | Swander et al. | 290/1 R |
| 4,614,875 | A * | 9/1986 | McGee | 290/1 R |
| 6,172,426 | B1 * | 1/2001 | Galich | 290/1 R |
| 6,204,568 | B1 | 3/2001 | Runner | |
| 6,362,534 | B1 | 3/2002 | Kaufman | |
| 6,376,925 | B1 * | 4/2002 | Galich | 290/1 R |
| 7,429,145 | B2 * | 9/2008 | Rastegar et al. | 404/71 |
| 7,530,760 | B2 * | 5/2009 | Rastegar et al. | 404/10 |
| 2002/0145350 | A1 | 10/2002 | Henderson | |
| 2007/0257495 | A1 * | 11/2007 | Kim et al. | 290/1 R |

FOREIGN PATENT DOCUMENTS

WO  02054569 A2  7/2002

OTHER PUBLICATIONS

International Preliminary Report on Patentability published Mar. 30, 2010 for International Application No. PCT/NL2008/050621, filed Sep. 26, 2008.
Written Opinion published on Mar. 28, 2010 for International Application No. PCT/NL2008/050621, filed Sep. 26, 2008.
David Atkinson, Reclaim the beats, (Feb. 17, 2007), pp. 1-3, XP-002509114, The Guardian.
International Search Report published Apr. 2, 2009 for International Application No. PCT/NL2008/050621, filed Sep. 26, 2008.

* cited by examiner

Primary Examiner — Tho D Ta (57) ABSTRACT

The invention concerns a floor suitable for generating, converting and/or storing energy, wherein this energy can be generated, converted and/or stored by placing and/or displacing mass thereon, wherein the floor can comprise discrete modules (2), each with an own energy generation system. The discrete modules (2) are couplable in different configurations and form a floor which may or may not be continuous.

14 Claims, 13 Drawing Sheets

FLOOR SUITABLE FOR GENERATING, CONVERTING AND/OR STORING ENERGY

The invention relates to a floor, in particular a floor for generating energy.

In modern nightlife and clubbing, generally much more energy is consumed than in a normal household. A large part of this energy is for instance spent on the lighting and/or the sound. The average nightlife visitor is hardly aware of the amount of energy that is consumed during clubbing. There are a number of possibilities of limiting the amount of energy consumed. For instance, less lighting may be used, the music may be played less loud, or a climate system may be used less. By these measures, however, the visitors hardly become more aware of the energy consumption in nightlife. Moreover, these measures might adversely affect the fun for these visitors.

An object of the invention is to provide a system by which the users become more aware of the amount of energy used up during nightlife. Another object of the invention is to provide an alternative manner of generating electricity. A further object of the invention is to provide a floor which is simple to produce, easy and convenient in use, stable, robust, durable and light. At least one of these and other objects is achieved with a floor according to claim 1.

In the subclaims, further advantageous embodiments of the invention are described.

The invention will be further elucidated on the basis of exemplary embodiments which are represented in the drawing. In the drawing.

It is noted that the drawing is only a schematic representation of embodiments of the invention. In the figures, equal or similar parts are indicated with corresponding reference numerals.

Figure 1:
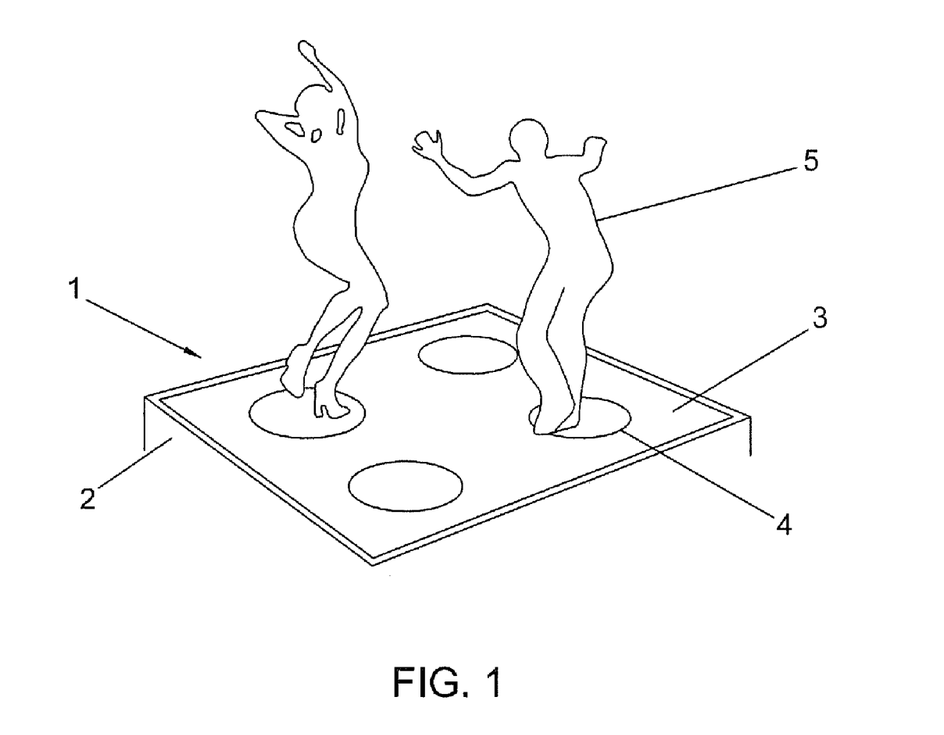
FIG. 1 shows a perspective view of a first embodiment of the invention with a floor.

In the perspective view of FIG. 1 a floor or at least a floor module 1 is represented. On this floor module 1, on the floor surface 3 movable elements 4 are arranged. These elements are resiliently arranged and can be tilted and/or depressed or otherwise moved or deformed by the weight of a user 5 dancing thereon.

Figure 2:
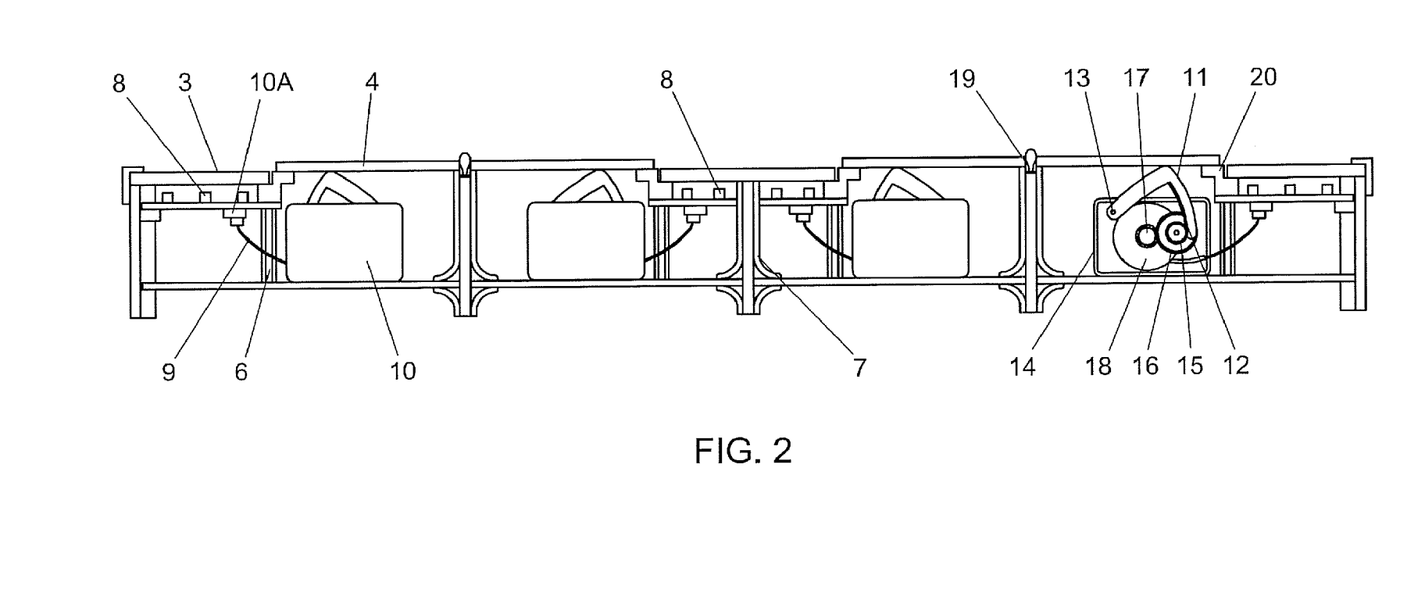
FIG. 2 shows a sectional view of a first embodiment of the floor.

FIG. 2 represents a sectional view of the floor of FIG. 1. In this figure, a floor surface 3 is supported by a supporting frame 6 with supporting elements 7. The floor surface 3 is for instance manufactured from a translucent or transparent material. Under the floor surface 3, light-emitting elements 8 may be arranged. These light-emitting elements 8 are supplied and controlled via connecting cable 9 and connector 10a. The connector 10a is connected via connecting cable 9 with a generator 10. The generator 10 has a movable arm 11 with a rack 12, which arm 11 is connected with the housing 14 so as to be pivotable about a pivot 13. The upper side of the arm 11 touches the underside of the movable floor element 4. The rack 12 runs along a pinion 15. The pinion 15 is for instance a gearwheel which is attached to transmission gearwheel 16. The transmission gearwheel 16 drives via a third gearwheel 17 a dynamo 18. The dynamo 18 is connected via the connection 9 with the connector 10.

If the dancer 5 steps onto the movable floor element 4, this floor element 4, under the weight of the dancer 5, will tilt about the pivot 19 and/or spring down. As a result, the arm 11 is pivoted about the pivot 13, the rack 12 of the arm 11 thereby driving the dynamo 18 via the gearwheel 15, the transmission gearwheel 16 and the third gearwheel 17. As a result, in the dynamo 18, electricity is generated electromechanically. This electricity can be transferred via connecting cable 9 and connector 10a to the light elements 8. If the dancer 5 moves away or steps off the element 4, the movable element 4 springs back into its original position. Such rebound may be caused for instance by the resilient sealing 20, by a resetting mechanism engaging the arm, the resilience of the element, or other resetting mechanism. The arm 11 is also provided with a spring mechanism, so that the arm 11 returns to its original position. By this return movement, the dynamo 18 may be driven again, via the rack 12 and the gears 15, 16 and 17. A freewheel clutch may then be arranged, so that the dynamo is only driven upon either the upward or the downward movement. Also, the rack may be so designed that upon rebound a counter runner is driven, so that also upon the return movement the dynamo is driven in the same direction of rotation.

In FIG. 2, two generators 10 per movable element 4 are shown. The tilting point 19 may be a cam over which the movable element 4 can tilt about one axis. Alternatively, the tilting point may be designed as a one-point suspension. If the tilting point forms a one-point suspension, more than two generators 10 may be placed around the tilting point. The element 4 can then tilt in all directions relative to the horizontal plane. The element 4 may also be wholly or partly articulate or flexible.

Figure 3:
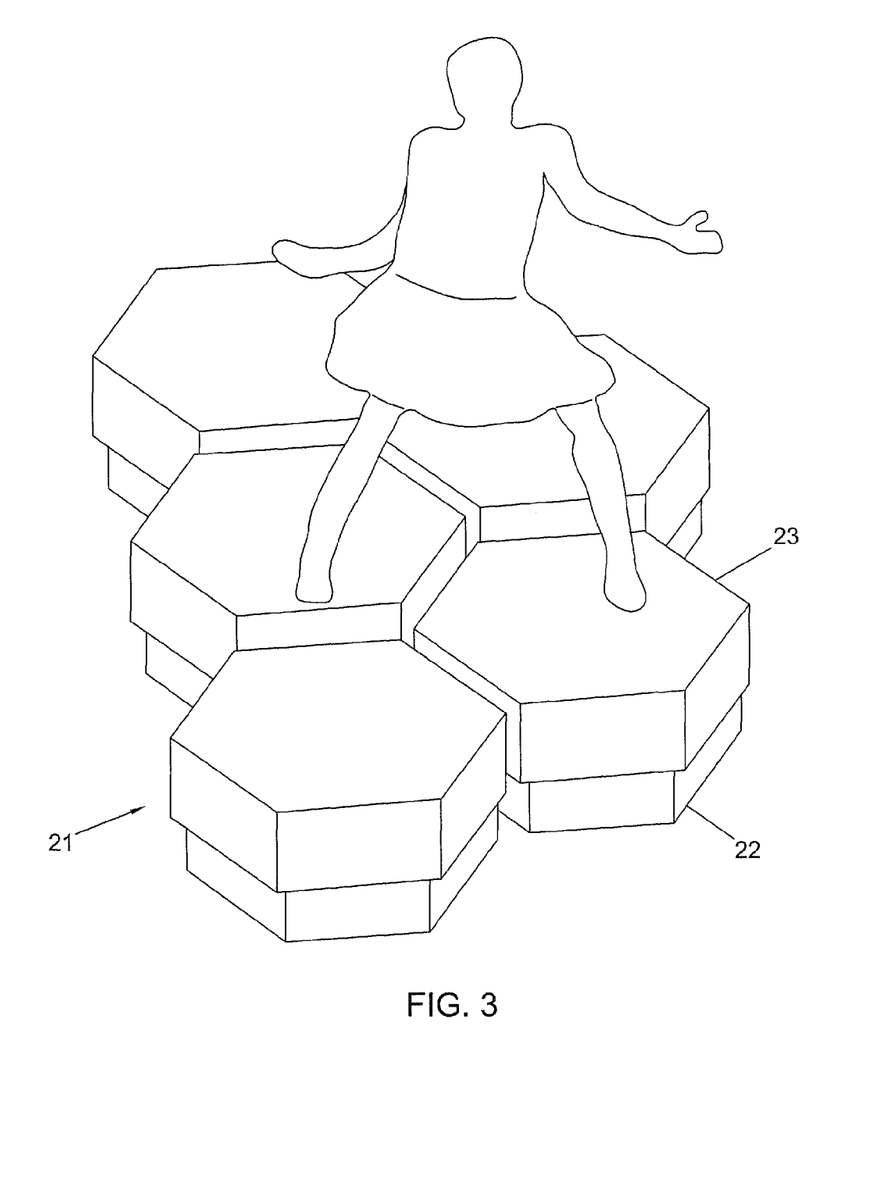
FIG. 3 shows a perspective view of a second embodiment of the floor.

The movable dance floor, as is represented in FIG. 3, may consist of a number of modules 21 which are for instance of polygonal design. The modules 21 comprise a lower part 22 and an upper part 23. The upper part 23 is movable relative to the lower part 22. Between the lower part 22 and the upper part 23, generators 10 may be arranged similarly to the manner as shown in FIG. 2. It is then possible that the upper parts 23 can move in a vertical sense relative to the lower parts 22. It is also possible that the upper parts can move relative to an axis or tilting point, as represented for instance by the elements 4 in FIG. 2.

Figure 4:
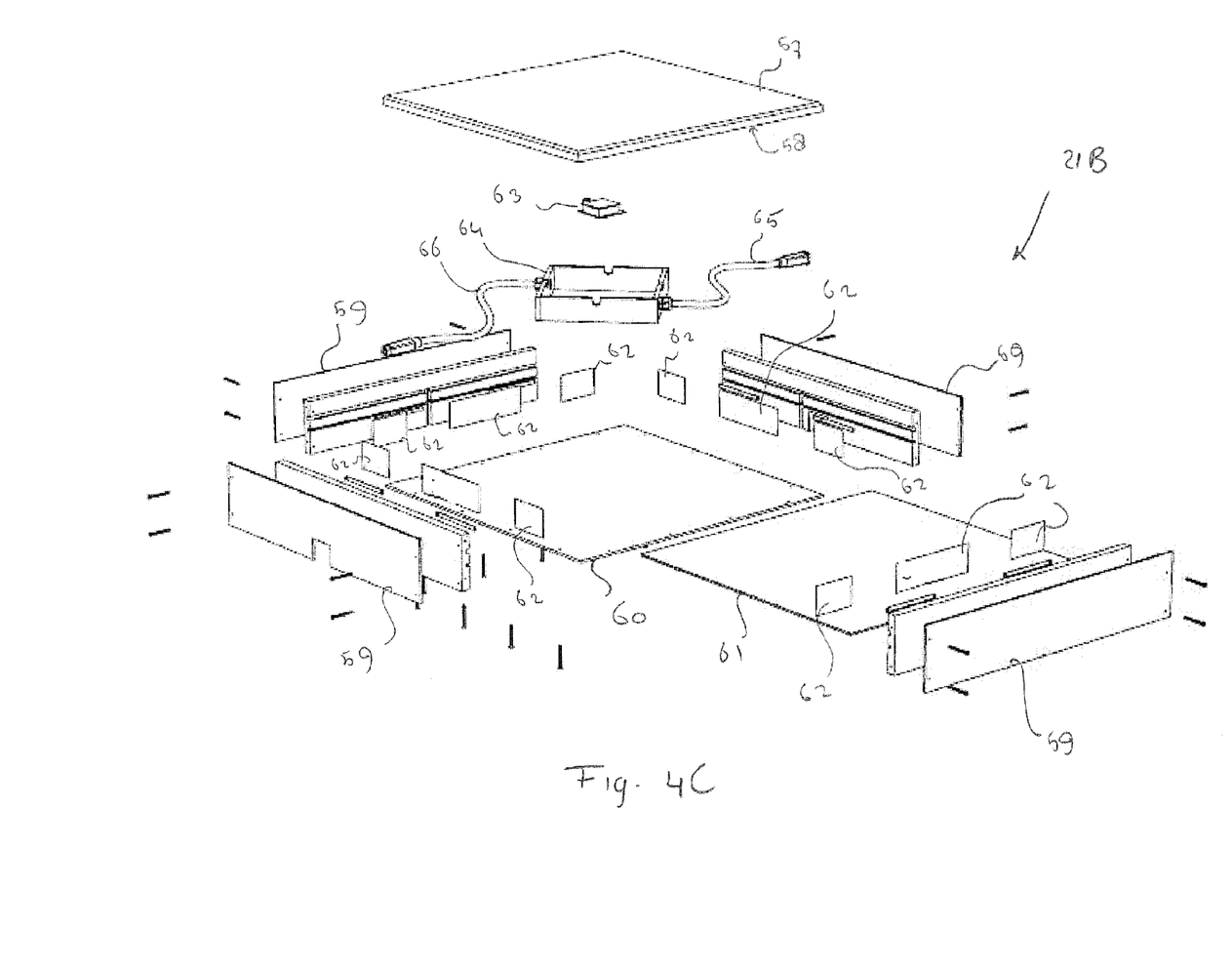
FIG. 4A shows a sectional view of the second embodiment of the floor.
FIG. 4B shows a sectional view of an energy generating module of the floor.
FIG. 4C shows an exploded view of an interface module of the floor.
Figure 4A:
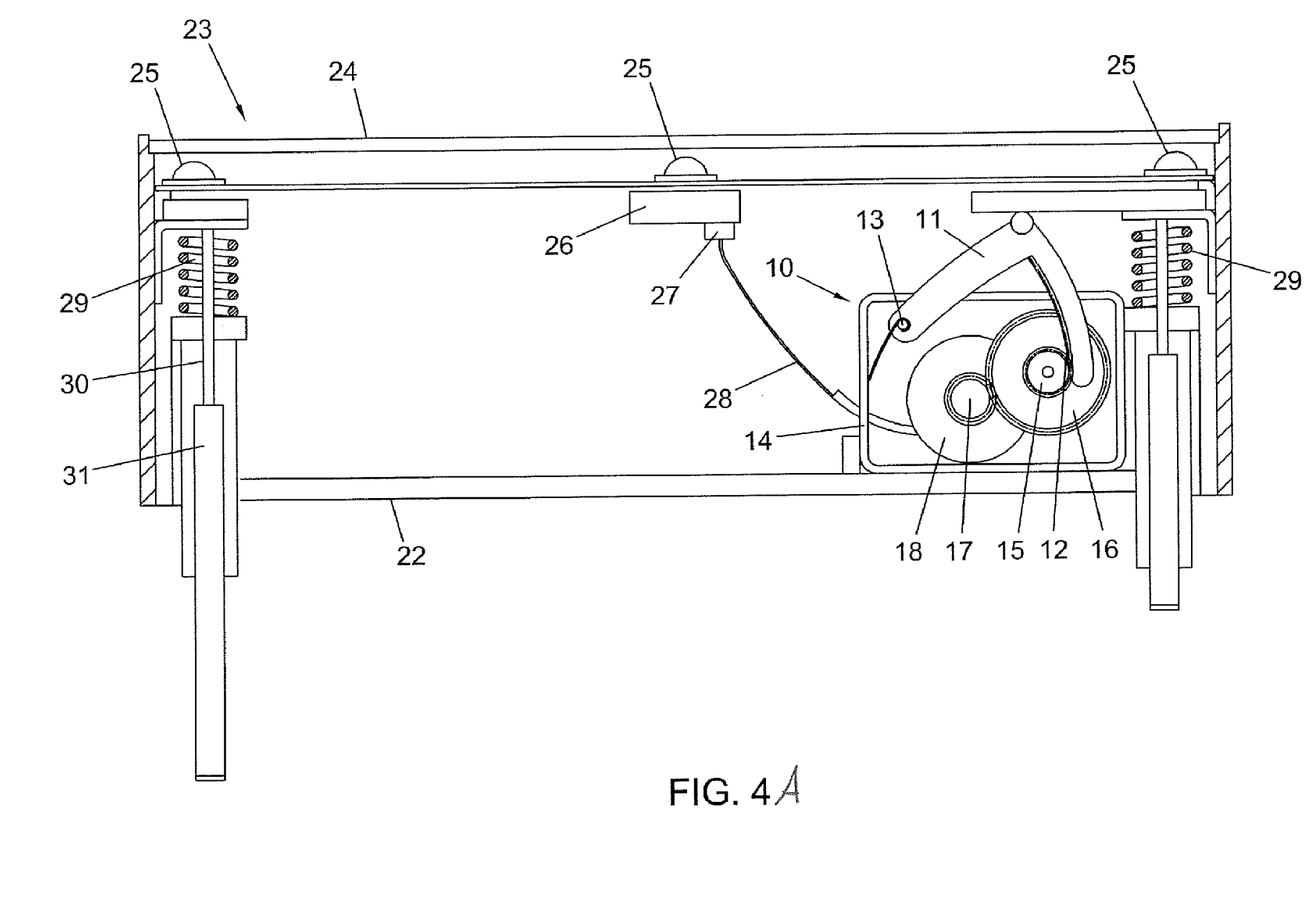

FIG. 4A represents a cross section of the polygonal modules 21 of a dance floor. The upper part 23 here can be moved relative to the lower part 22 in a vertical sense. Pins 30 thereby slide in directing slots 31. The upper part 23 is held in place by the springs 29. The upper part can have a transparent or translucent floor plate 24 under which a number of light elements 25 may be arranged. The light elements can be supplied and controlled via supply box 26 which, via connector 27 and connecting cable 28, is connected with the dynamo 18 of the generator 10. If the dancer 5 steps onto the polygonal element 21, then, under his or her weight, the upper part 23 moves relative to the lower part 22. The springs 29 are thereby compressed and the arm 11 with the rack 12 is rotated. The rack 12 thereby drives the gears 15, 16, 17 again. As a result, the shaft of the dynamo 18 is rotated, so that electricity is generated. This electricity is passed on via connection 28, connector 27 and supply box 26 to the light device 25. After the dancer 25 shifts his weight or steps off the polygonal element 21, the upper part 23 of the element 21 springs back to its original position. As a result of this returning effect, arm 11 with rack 12 rotates back into its original position. By this movement, again electricity is generated in the dynamo 18, which is passed on to the lighting installation 25. In this way, the dancer 5, by dancing on the elements 21, can indirectly operate the lighting installation 25. This adds an extra dimension to the dancing. The active dancer 5 is rewarded for his performance with light. Also, through this dance floor, in a playful manner, the clubbing crowd can be made aware of the energy consumption of for instance lighting installations. Apart from a fun factor, this dance floor can further add an educational element to clubbing.

Figure 4B:
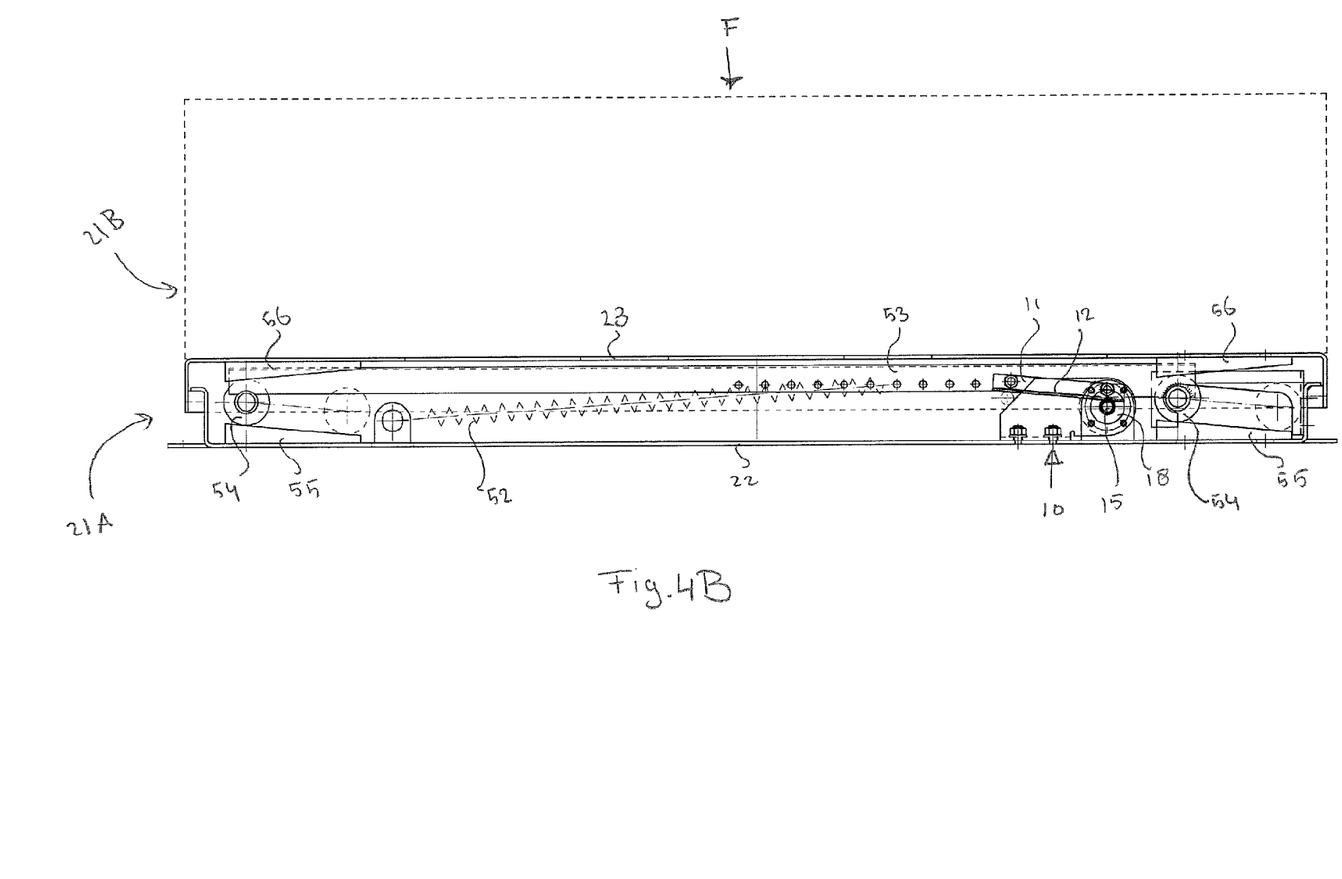

FIG. 4B represents a cross section of an alternative embodiment of a floor module 21. In this figure, a floor module 21 comprises a lower part, being an energy generating module 21A and an upper part, being an interface module 21B, represented in dashed lines. The interface module 21B is depicted in more detail in FIG. 4C and is described further below. The energy generating module 21A comprises a first part 22 and a second part 23 which can move relative to each other along an upwardly arranged axis. Wedges 55 are connected to the first part 22 and wedges 56 are connected to the second part 23. Between the wedges 55 and 56, rollers 54 are arranged, which are rotably connected to a transmission part 53. At least one spring 52 is arranged between the first part 22 and the transmission part 53.

The first part 22 can be positioned on a solid base, the second part 23 can drive a generator 10 either by direct means or via the transmission part 53.

Once e. g. a dancer 5 steps on the floor module 21, the second part 23 is forced downwards by a force F, induced by the weight of the dancer 5. By the downward motion of the second part 23, the wedges 55 and 56 are approaching each other, forcing the rollers 54 and the transmission part 53 to move sideways. This sideways motion of the transmission part 53 drives the generator 10, for example, by means of a rack 12 and pinion gear 15 which converts the linear vertical movement of the second part 23 into a rotary motion of the pinion 15. The pinion 15 can be connected to the shaft of a dynamo 18, converting the applied kinetic energy into electrical energy.

Once the dancer 5 steps down from the floor module 21, the force F is removed. The second part 23 can be forced back to its original position either by direct means 29, as is shown in FIG. 4A or via the transmission part 53 using resilient means such as a passive spring 52.

Generally, although not limited thereto, the electric generator 10 can be a rotary device. An advantage of such arrangement is, that generated electrical energy and/or the resistance to movement of the second part 23 relative to the first part 22, can be influenced by varying the electrical load on the dynamo 18. For example by short circuiting the dynamo 18 of the generator 10, the resistance to motion of the dynamo 18 will be maximized, causing the pinion 15, the rack 12 and the transmission part 53 to be virtually blocked. Thus, the relative motion of the second part 23 in relation to the first part 22 will be virtually blocked as well. This will influence the respective dancing experience of the dancer 5.

Additionally to converting kinetic energy into electric energy also electric energy can be converted into kinetic energy. This reverse conversion can be achieved by using dynamo 18 as a motor instead of using it as a generator so as to move the second part 23 relative to the first part 22. This variation can be done very rapidly, e.g. with a relatively high frequency and/or varying waveform and for instance a very small response time. Consequently, when the dance floor is used in e.g. a club, the floor can be moved by virtue of applying electrical energy.

In a further elaboration of the active floor, the electrical source can be connected to a control unit for controlling the current delivered to dynamo 18 and, consequently, for controlling the relative movement characteristics of the floor. The control unit can be adapted for continuously varying the current of the electrical source, so that the relative movement of the second part 23 with respect to the first part 22 can continuously be varied at any moment. The relative movement can be increased by controlling the electric source to create a varying amplitude which either supports or counteracts the force generated by e.g. a spring 52. Such a current variation can be effected at any moment and at any position of the first part 22 relative to the second part 23.

By means of altering the length, automatically or manually, of the spring 53 in this embodiment the floor module 21 can be made suitable to a large range of applied masses.

An alternative embodiment could be a floor module 21, in which the vertical movement of the second part 23 is directly converted into electric energy, e.g. by a linear motor. Such a linear motor can for instance be placed in between the first 22 and the second part 23.

FIG. 4C represents the interface part 21B of the floor module 21. The interface module 21B comprises an upper, partly transparent or transparent plate 57, which can be provided with for instance a half translucent mirror layer 58 or a translucent liquid crystal display. The liquid crystal display can be more or less translucent due to the amount of current guided through the display or its separate pixels. Thus, pictures, structures or moving pictures like for example video's can be shown on the plate 57.

The interface module 21B further comprises a set of side wall portions 59 connected to each other and to the bottom plate 60. The side wall portions 59 can be provided with illumination means 62 such as e.g. an arrangement of light emitting diodes (LEDs). These LEDs can for example be arranged inside or on a strip, which can be glued or mounted against the wall portions 59.

On top of the bottom plate 60, a mirror plate 61 can be arranged. By the mirror plate 61 and the half translucent mirror layer 58, a reflecting effect can be generated that can simulate an endless deepness of the module 21. By this arrangement, the illumination means 62 can for example be reflected between the two mirroring surfaces 58 and 61, thus generating an approximately infinite number of reflections.

The interface module 21 can be further provided with a printed circuit 63 for controlling the light effects of the illumination means 62. This printed circuit 63 can be protected by a waterproof casing 64, which can be connected by means of a cable 65 to e.g. the dynamo 18 of the energy generating module 21A on which the interface module 21B can be placed.

The illumination means 62 can also be connected to the printed circuit 63, for example by means of a cable 66. By connecting the dynamo 18 of the energy generating module 21A via the printed circuit 63 and the cables 65 and 66 to the illumination means 62 in the interface module 21B, a dancer 5 can be illuminated by his own motion, exerted on the floor module 21.

Alternatively, the interface module 21B can also be centrally controlled, such that when more modules 21 are applied in a dance floor, several light patterns and/or other effects can be generated. Besides the light effects also the resistance to the motion can be centrally controlled. In this case, a disc jockey can be equipped with additional interactive tactile means for communication with the dancers and/or other visitors on the dance floor.

The printed circuit in each module 21 can for example be separately programmable, can be integrated in a central control system and/or can be adapted to recognize other modules 21 based on the software integrated in the respective module 21. Additionally, upgrades of the software inside the modules can be centrally performed.

With such an arrangement, interactions among the dancers and/or interactions between the dancers and a disc jockey can be provided that go beyond the interactions available in conventional clubs or discotheques. For example several levels of energy generation can be made individually and per module visible through different colors and/or different light intensities. For instance a first activity level can be colored blue, a second activity level can be colored red and a maximum activity level can be colored green. Additionally or alternatively, a sort of high score activity can be rewarded with additional light effects such as flashes or blinks of the illumination means. Thus the activity of the dancers can be monitored in an attractive interactive way.

Although the floor 1 in the FIGS. 4A, 4B and 4C is depicted as comprising square floor elements 21, other shapes of the elements can similarly be applied. For instance, the modules 21 can have an elliptical, a round, a circular, a rectangular, a triangular, a polygonal and/or other geometrical shapes.

Figure 5:
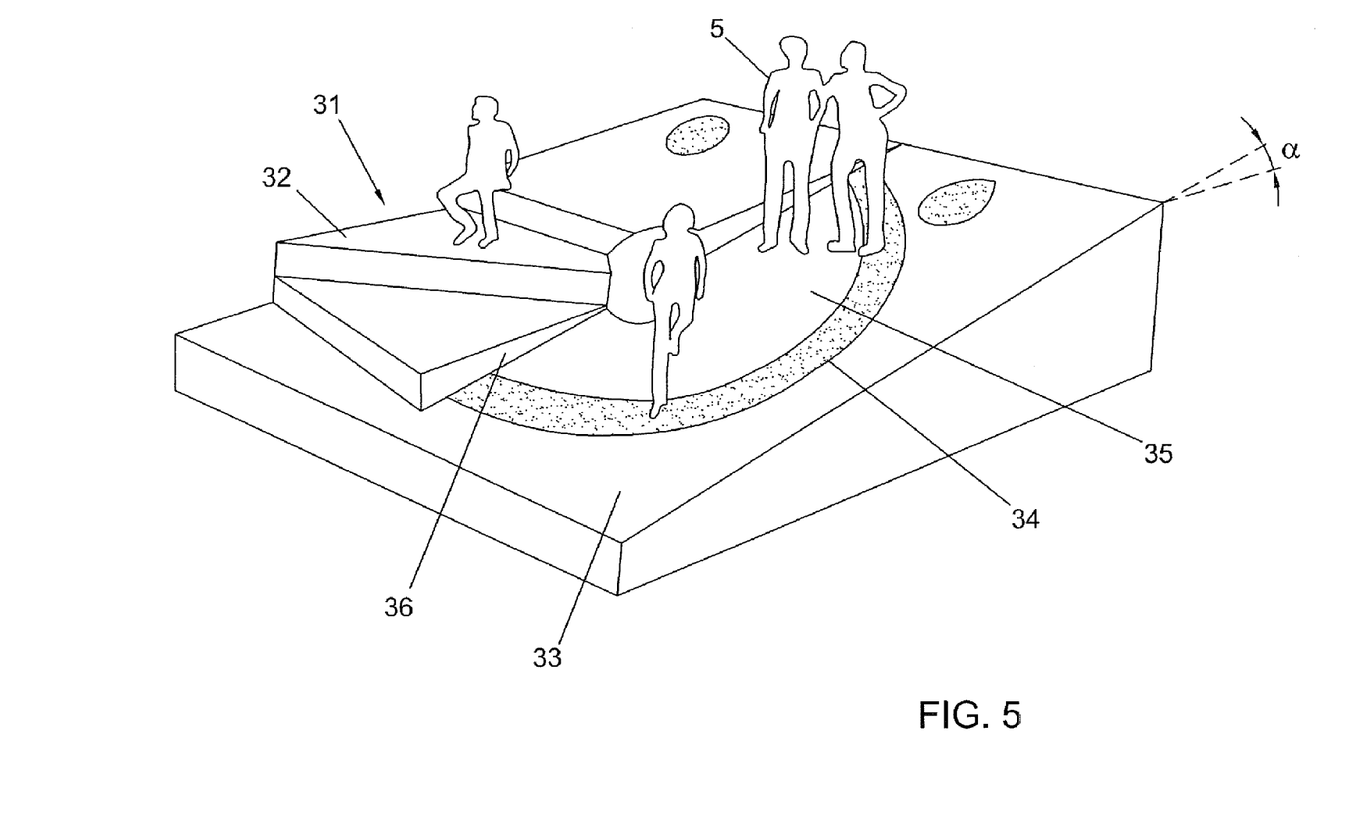
FIG. 5 shows a perspective view of a third embodiment of the floor.

An alternative embodiment may for instance be a rotary disc as is represented in FIG. 5. Here, a rotary disc 34 has been integrated into the floor at an angle α with the horizontal plane. As the dancer proceeds to stand on the upper side 35 of the thus inclined disc 34, the disc 34 begins to move as a result of the weight of the dancer 5. As a result of the rotary movement, the dancer 5 will end up at the lowest point 36. Thereupon the dancer can walk via the steps 32 to the upper part 35 of the rotary disc 34 again. Then he can step on the upper portion 35 of the rotary disc 34 again, and again come down as a result of the rotary action of the disc and his weight.

Figure 6:
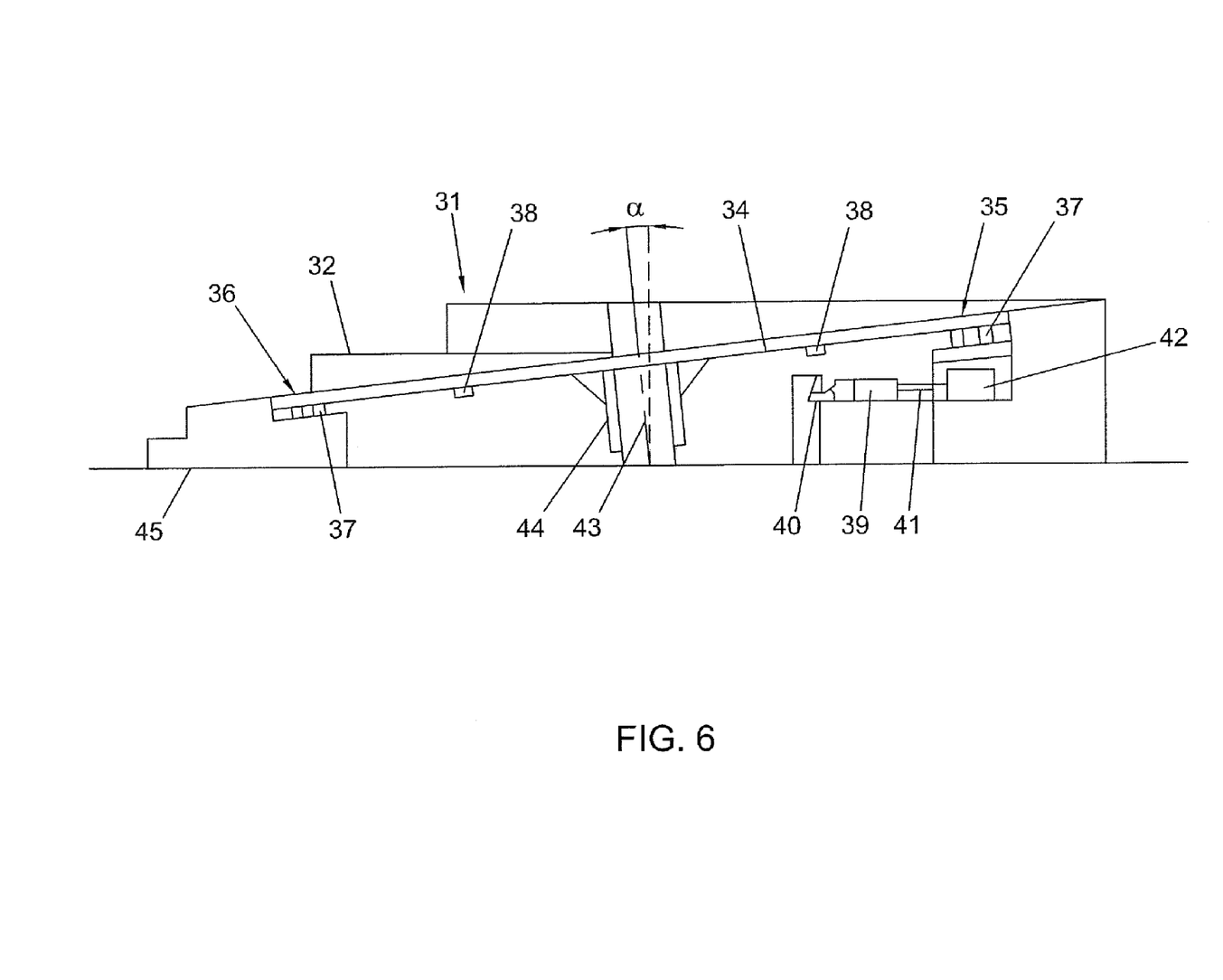
FIG. 6 shows a sectional view of the third embodiment of the floor.

In FIG. 6, a schematic section of the dance floor 31 as represented in FIG. 5 is shown. The rotary disc 34 may here be manufactured in whole or in part from a translucent or transparent material. The rotary disc 34 may be borne above the base 45 while supported via bearing 37. The rotary disc 34 is here rotatably connected with the base 45 at an angle α via shaft 43. Around the shaft 43, on the rotary disc 34, a supporting sleeve 44 may be mounted. The rotary disc 34 furthermore has a tooth track 38 at its underside. This tooth track drives the shaft 41 of the dynamo 42, via for instance a cardan joint 40 and the transmission 39. The dynamo 42 can then provide energy to lighting at, for instance, the underside of the rotary disc 34. Also, the dynamo 42 can deliver the energy to other lighting. Through the rotary disc, a new dimension is added to dancing in nightlife.

Figure 7:
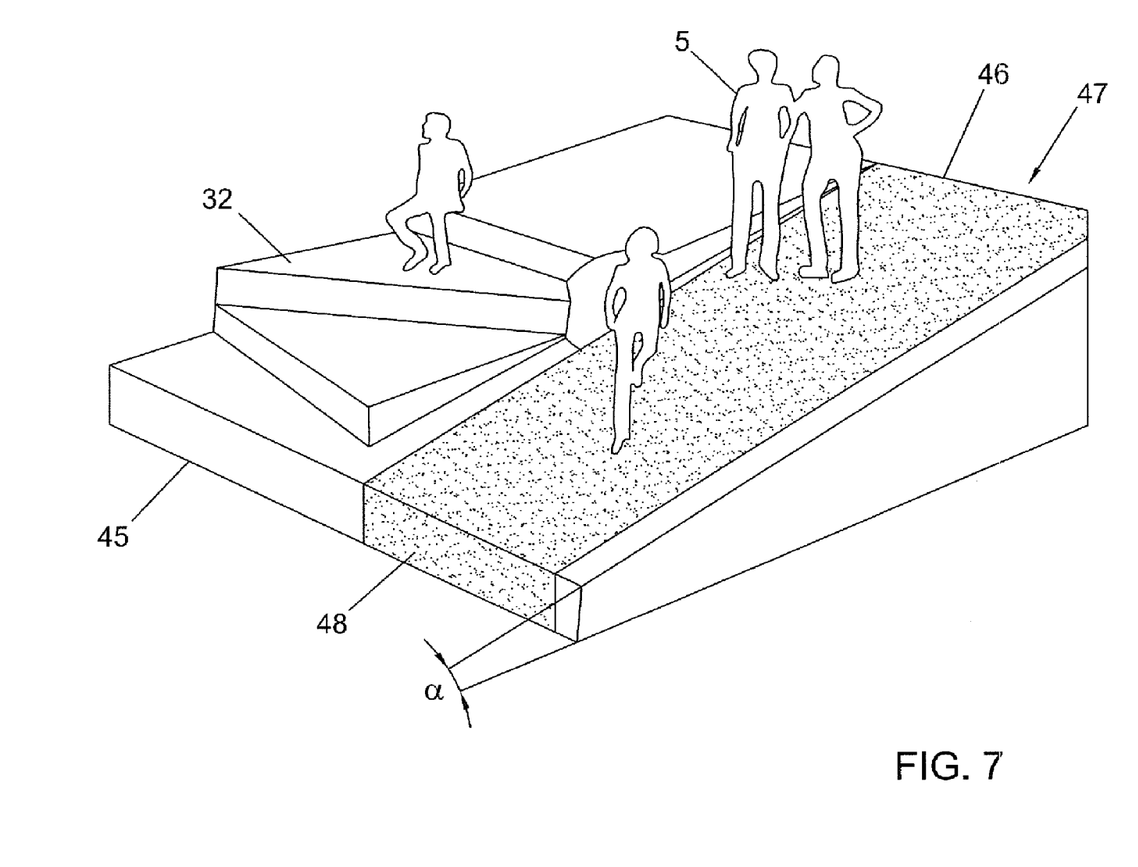
FIG. 7 shows a perspective view of a fourth embodiment of the floor.

FIG. 7 shows a dance floor in the form of a walking belt 46. If via the steps 32 the dancer 5 steps on the upper portion 47 of the walking belt 46, this walking belt begins to move as a result of his weight. In this way, the dancer moves from the upper portion 47 of the walking belt 46 down to the lower portion 48 of the walking belt 46. The dancer can now reach the upper portion 47 of the walking belt 46 again via the steps 32. The energy of the movement of the walking belt can be generated in a manner corresponding to that shown in FIGS. 5 and 6.

Figure 8:
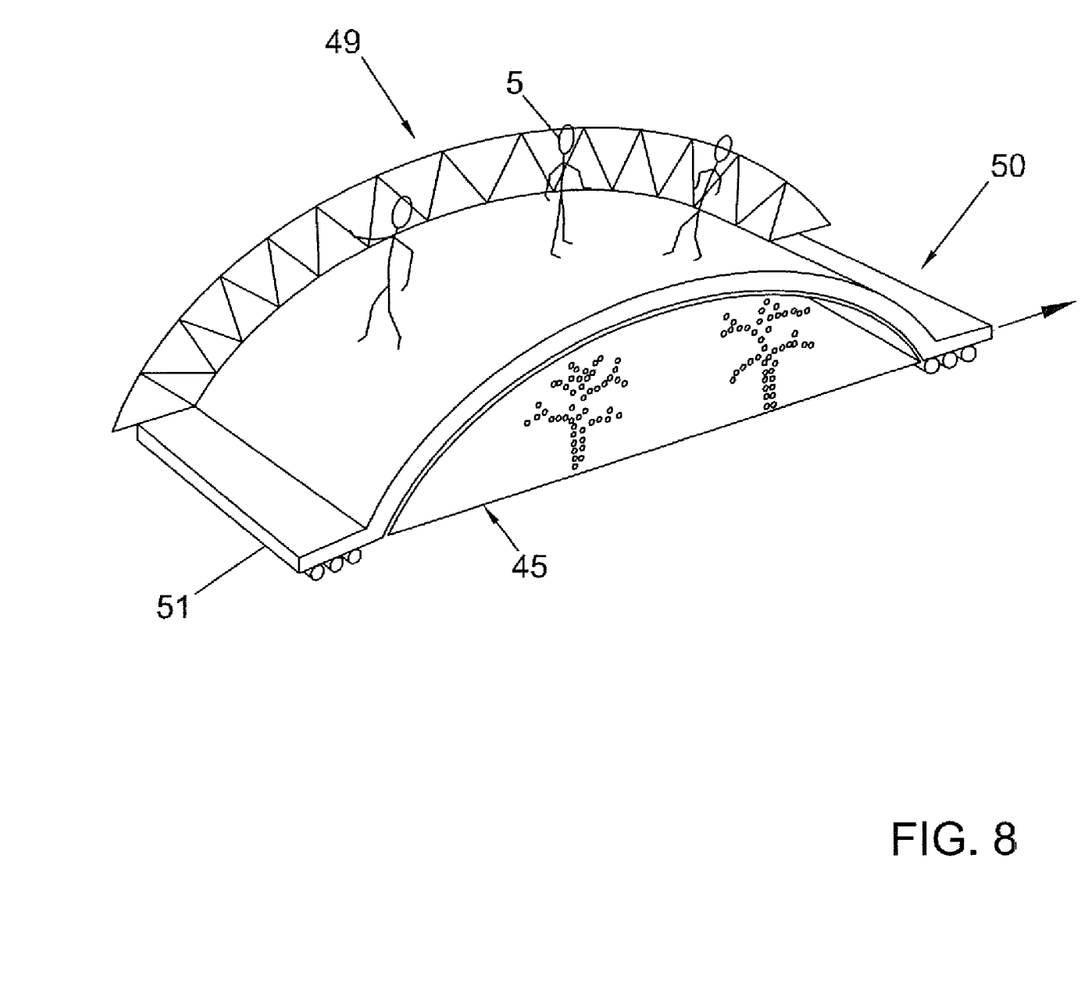
FIG. 8 shows a perspective view of a fifth embodiment of the floor.

FIG. 8 represents an alternative electricity-generating dance floor. The dance floor is here designed as a bridge 49. This bridge 49 is deformable to some extent under the weight of the dancer 5. As the dancer 5 steps onto the bridge 49, the bridge part 50 movably arranged on the base 45 moves in horizontal direction relative to the fixed base 45. This movement can again be converted into electricity. The bridge part 51 may be connected with the base 45 but may also, like the bridge part 50, be movable relative to the base 45. The bridge 49 can then for instance as a whole move to some extent in the horizontal plane.

Figure 9:
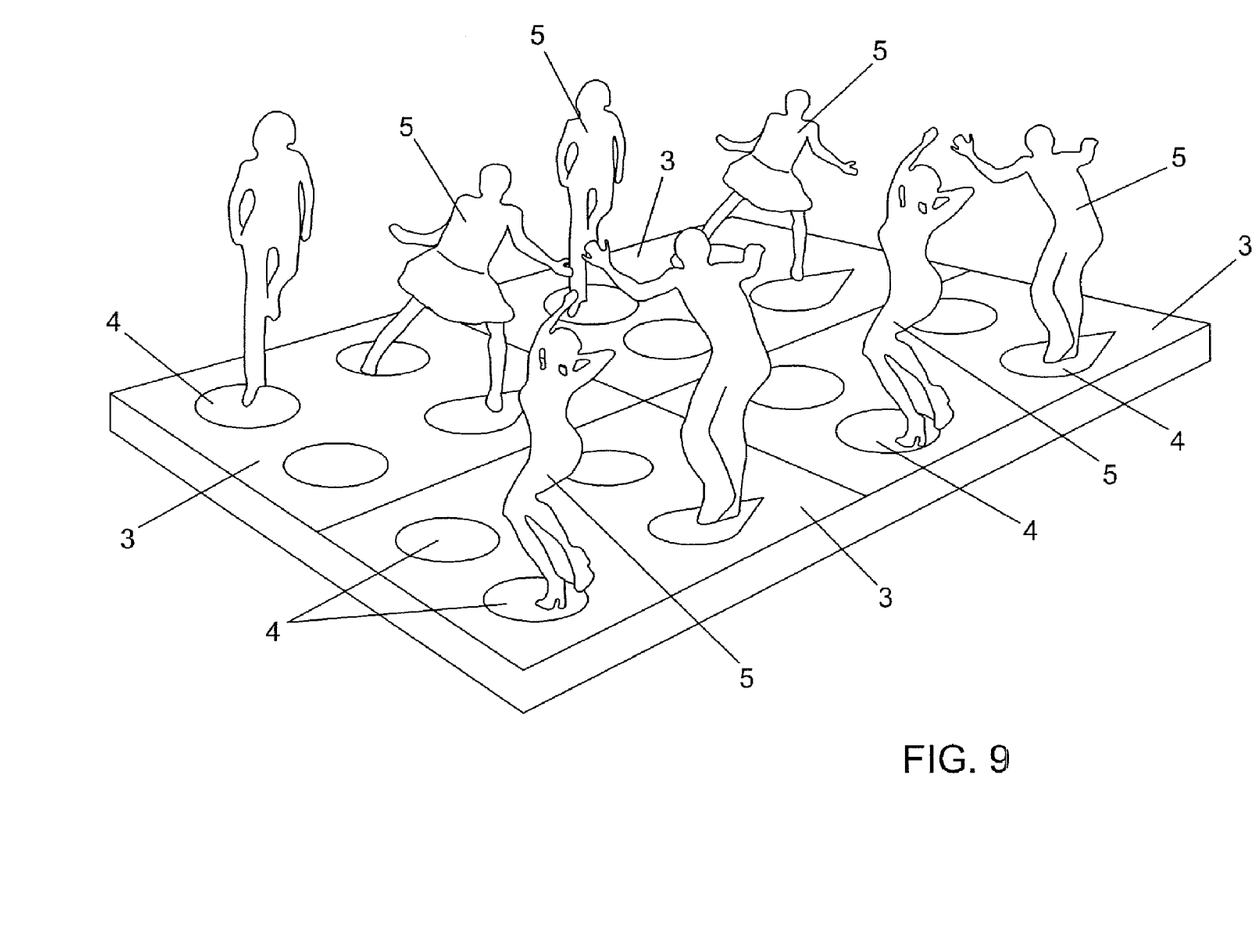
FIG. 9 shows a perspective view of a sixth embodiment of the floor.

FIG. 9 represents an example of the modular assembly of a dance floor by means of the dance floor modules 1 from FIG. 1. The modules are simple to couple in different configurations and, in coupled condition, form a dance floor which may or may not be continuous.

Figures 10, 11:
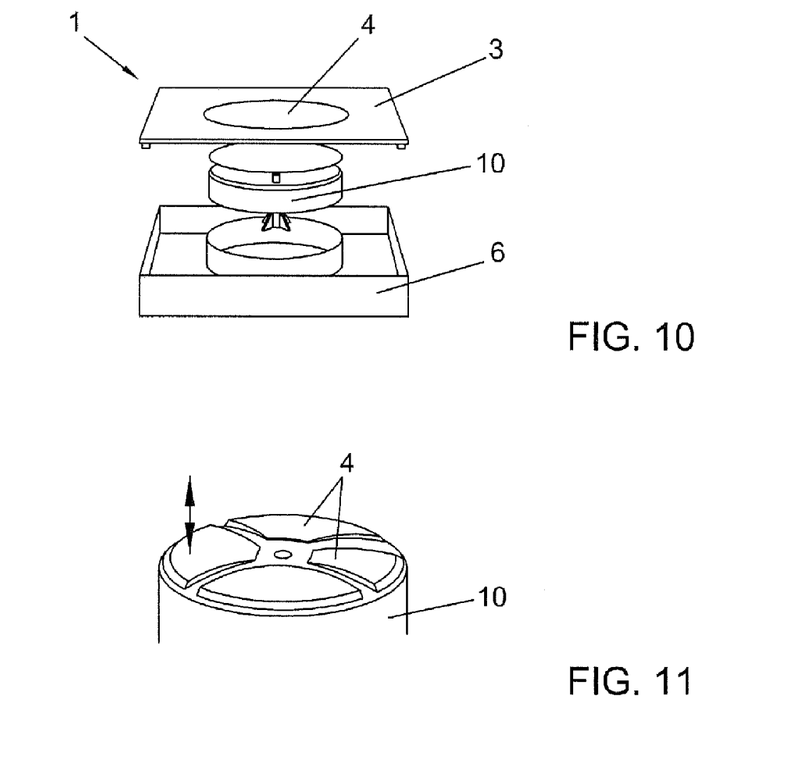
FIG. 10 shows a partly exploded view of the first embodiment of the floor.
FIG. 11 shows an alternative embodiment of a movable element of the floor.

FIG. 10 shows one of the modules 1 of the dance floor in an exploded view. A discrete module 1 here comprises a level transparent floor surface 3 which is arranged on a bearing frame 6. In this bearing frame 6, a generator 10 is arranged. In this floor surface 3 movable elements 4 are arranged. These elements 4 are in connection with generator 10 and can for instance move or deform in a vertical sense. As a result, energy can be generated as has been described in detail in the description of FIG. 2. The movable elements 4 may be arranged in different ways and in varying designs.

FIG. 11 shows an alternative design of the movable elements 4. The movable elements 4 project to some extent above level upper side 3 and can move when a sufficiently great force in vertical direction is exerted on them. Upon removal of the vertical force, the movable element 4 will return to its original position by means of a spring. The vertical displacement may then be damped by an electromechanical or different system 10, so that electricity is generated. The generator 10 here may be disposed in the module 1. The thus generated energy can be used for supplying and/or controlling for instance light sources which are placed in and/or near the module. In this way, the user of the floor module 1 can obtain feedback on his dance movements on the floor module. This can for instance be done in that, on the basis of his movements, variations in the intensity and/or the color of the light are generated.

Figure 12:
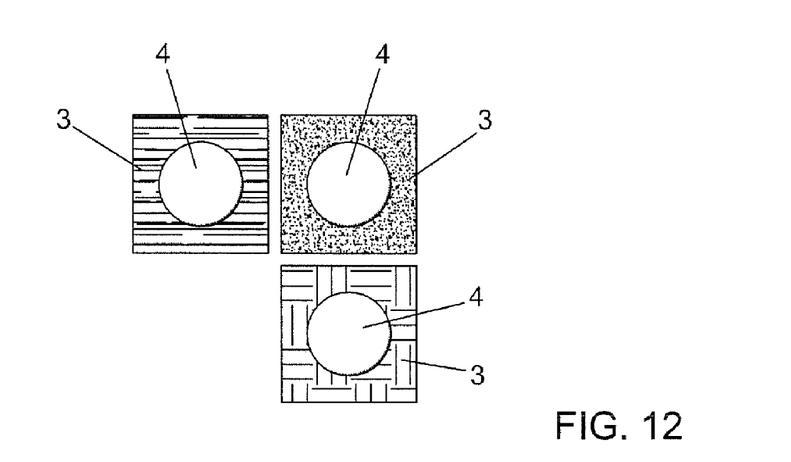
FIG. 12 shows a top plan view of alternative embodiments of the upper surface of the floor.

The movable elements 4 may be attached to the upper surface 3 in a water-tight manner. Furthermore, transparent floor surfaces 3 may be provided with different graphic motifs. This is for instance represented in FIG. 12.

Figure 13:
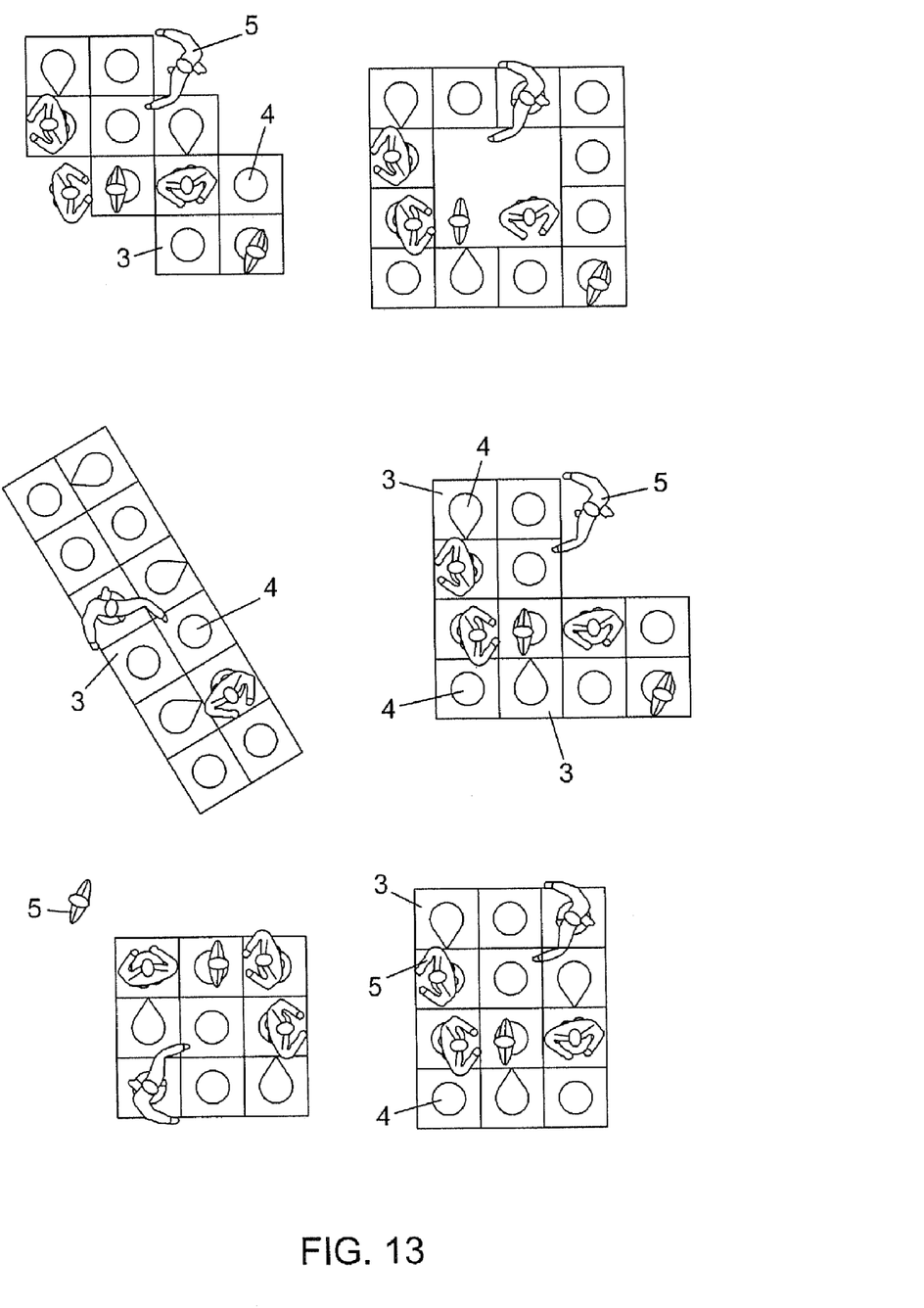
FIG. 13 shows a top plan view of alternative embodiments of the configuration of the modules of the floor.

In FIG. 13, an example is given of how the discrete modules 1 may be coupled to form diverse configurations of the dance floor.

It is noted that the invention is not limited to the exemplary embodiments discussed here. The generated energy, besides being used for lighting and/or sound, may also be used, for instance, for displaying on a projection screen, for instance, the person who generates most energy during dancing. Also, the price of refreshments may be influenced by the amount of energy which has been generated during dancing. Further, individual lighting may be influenced by the amount of energy being generated during dancing. Furthermore, various sound effects may be controlled by the users of the dance floor. Also, the amount of energy generated may be graphically represented.

Further, for instance, the floor may also be used in other situations and/or at other locations. The floor may for instance be used in shopping centers, stations, stadiums and other establishments where many people are around. The floor may also be used in traffic and/or in the industry.

The generation of the energy with the aid of the floor can also take place with one or more piezo elements. Also, by means of a pump system in the floor, water may be pumped to a higher container. Upon reflux of the water, via a turbine, paddle wheel and/or otherwise, energy may be generated. Also, for instance, by the use of the floor, a weight may be lifted via a pulley system. To one or more of the pulleys of the pulley system, a dynamo may then be coupled.

These and other variants will be clear to those skilled in the art and are understood to be within the scope of the invention as set forth in the following claims.

The invention claimed is:

1. A floor module comprising:
   an energy generating module configured to convert a movement of at least a part of the energy generating module into electrical energy, said energy generating module including an electric generator;
   an interface module, configured to support a moving person, wherein a force applied by the moving person to said interface module causes a displacement of at least a part of the interface module, said displacement causing said movement of at least the part of the energy generating module; and
   a lighting installation in the floor module, wherein said lighting installation is electrically coupled to the electric generator and is configured to illuminate the interface module and/or the moving person.

2. The floor module according to claim 1, wherein the interface module is provided with a printed circuit configured to control at least one light effect of the lighting installation, wherein said circuit is electrically coupled to the electric generator and the lighting installation.

3. A floor module according to claim 1, wherein the electric generator comprises a dynamo.

4. The floor module according to claim 3, wherein the dynamo is a rotary device, configured to allow resistance to movement of the second part relative to the first part to be influenced by varying the electrical load on the dynamo.

5. A floor module according to claim 3, wherein the energy generating module further includes:
   a first part;
   a second part movably arranged relative to the first part substantially vertically;
   first wedges connected to the first part and second wedges connected to the second part opposite to the wedges connected to the first part;
   rollers arranged between the wedges connected to the first wedges and the second wedges;
   a transmission part rotably connected to the rollers and connected to the dynamo of the electric generator;
   wherein relative movement of the second part towards the first part forces the rollers and the transmission part connected to the rollers to move substantially sideways, causing the transmission part to drive the dynamo.

6. The floor module according to claim 5, wherein the transmission part is connected to the dynamo by a rack and a pinion gear.

7. The floor module according to claim 5, wherein a spring interconnects the first part and the transmission part, such that the transmission part and the rollers connected to the transmission part are biased to force the first and second parts apart.

8. The floor module according to claim 1, wherein the interface module comprises:
   an at least partly transparent and/or translucent top plate.

9. The floor module according to claim 8, wherein the top plate is provided with a half translucent mirror layer and/or a translucent liquid crystal display.

10. The floor module according to claim 8, wherein the lighting installation comprises light emitting diodes.

11. The floor module according to claim 8, wherein the interface module comprises:
    a bottom plate;
    a set of interconnected side wall portions, which sidewall portions are provided with the lighting installation.

12. The floor module according to claim 11, wherein the bottom plate is provided with a mirror plate.

13. A floor comprising at least two interconnected floor modules, wherein each floor module comprises a floor module according to claim 1.

14. The floor according to claim 13, wherein the at least two interconnected floor modules each comprises an interface module with a printed circuit configured to control the lighting installation of the respective floor module, wherein the printed circuits are integrated with a central control system that operates the at least two interface modules of the floor in a coherent manner.

* * * * *